Nov. 17, 1953  J. D. SMITH, SR  2,659,573
SAFETY BELT CABLE TAKE-UP AND SHOCK ABSORBER
Filed Jan. 26, 1951                                2 Sheets-Sheet 1

Joel D. Smith, Sr.
INVENTOR.

Nov. 17, 1953  J. D. SMITH, SR  2,659,573
SAFETY BELT CABLE TAKE-UP AND SHOCK ABSORBER
Filed Jan. 26, 1951  2 Sheets-Sheet 2

Joel D. Smith, Sr.
INVENTOR.

Patented Nov. 17, 1953

2,659,573

UNITED STATES PATENT OFFICE 2,659,573

SAFETY BELT CABLE TAKE-UP AND SHOCK ABSORBER

Joel D. Smith, Sr., Alice, Tex.

Application January 26, 1951, Serial No. 207,911

3 Claims. (Cl. 254—152)

1

This invention relates to new and useful improvements in escape devices and the primary object of the present invention is to provide a safety device for workmen that will protect the workmen on high places from dangerous falls and which is so constructed as to keep the space around a workman's feet clear of rope, cable or the like that is attached to the user from the safety device.

Another important object of the present invention is to provide a safety device including a cable drum that travels and rotates on a threaded rod together with a spring biased buffer that will engage and prevent rotation of the drum after the drum has moved a predetermined distance on the rod.

A further object of the present invention is to provide a safety belt cable take-up and shock absorber involving a spring tensioned cable drum that travels and rotates upon a threaded rod together with a locking means for locking the drum against rotation and longitudinally adjusted on the rod whereby only a predetermined amount of cable will be exposed from the drum.

A still further aim of the present invention is to provide a safety device for scaffold or derrick workmen that is also adaptable as an emergency device and which device is simple and practical in construction, strong and reliable in use, efficient and durable in operation, and otherwise well adapted for the purposes for which the same is intended.

Other objects and advantages reside in the details of construction and operation as more fully hereinafter described and claimed reference being had to the accompanying drawings forming part hereof, wherein like numerals refer to like parts throughout, and in which:

Figure 1:
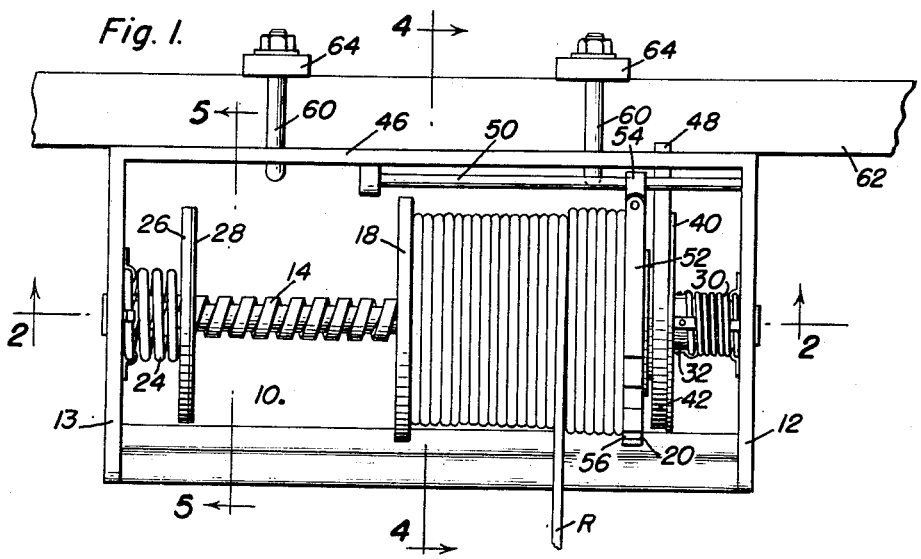
Figure 1 is a top plan view of the present invention.
Figure 4:
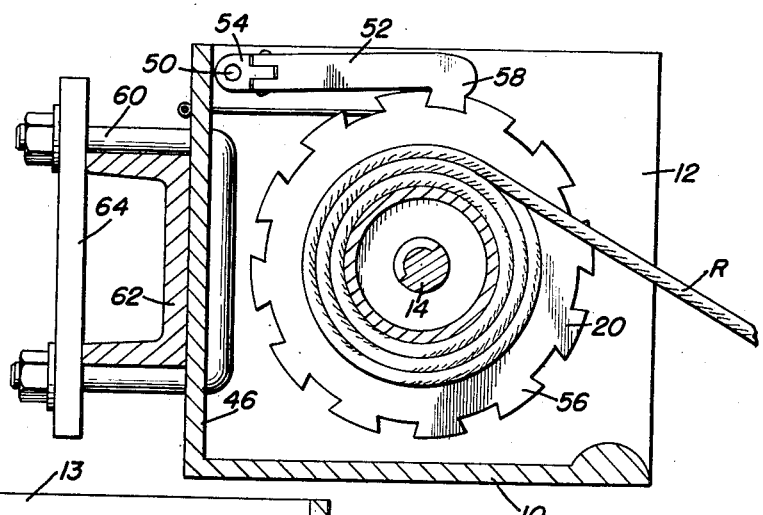
Figure 4 is an enlarged vertical sectional view taken substantially on the plane of section line 4—4 of Figure 1.
Figure 5:
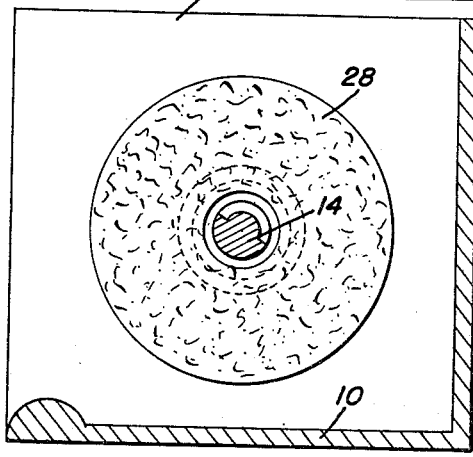
Figure 5 is an enlarged vertical sectional view taken substantially on the plane of section line 5—5 of Figure 1.
Figure 2:
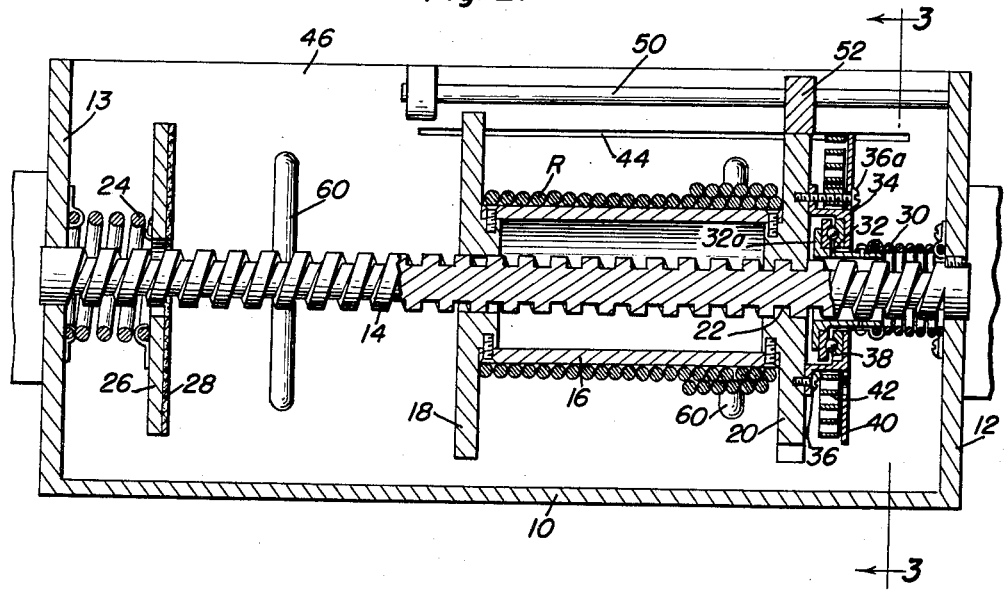
Figure 2 is an enlarged vertical sectional view taken substantially on the plane of section line 2—2 of Figure 1.

Referring now to the drawings in detail, wherein for the purpose of illustration, there is disclosed a preferred embodiment of the present invention, the numeral 10 represents a housing or trough open at two sides and having centrally apertured end walls 12 and 13 in which the ends of a threaded rod or shaft 14 are suitably fixed.

A cable drum 16 is provided with end flanges 18 and 20 that are centrally apertured to receive the shaft 14. The aperture 22 in the end flange 20 is internally threaded to receivably engage the shaft 14 so that the drum 16 will rotate and move longitudinally upon the shaft 14.

A coil spring 24 surrounds one end of the shaft 14 and this spring is secured at one end to the end wall 13. A brake member or buffer 26 is secured to the other end of the spring 24 and carries a brake surface or friction sheet 28. The buffer 26 is formed with a central opening that accommodates the shaft 14.

A helical spring 30 embraces the end of the shaft 14 remote from the spring 24. One end of the spring 30 is secured to the inner face of the end wall 12 and the other end of the spring 30 supports a collar 32. A hub 34 surrounds the collar 32 and is secured to the flange 20 by screws 36. A ball bearing race 38 is interposed between the hub 34 and the flanged portion 32a of the collar 32 to permit unrestricted rotation of the hub 34 with the drum 16.

A ring 40 is secured to the flange 20 and a main spring 42 rests against the plate or ring 40 and is secured at its inner end to the flange 20 by a screw 36a. The outer end of the spring 42 is slidably received in a slot 44 in the rear wall 46 of the housing 10 and this end terminates in a loop 48 that will prevent the end from slipping into the housing.

Means is provided for locking the drum against rotation and for adjusting the drum longitudinally upon the shaft 14. This means consists of a rod 50 that is mounted within the housing 10 and which parallels the shaft 14. A pawl or locking dog 52 includes a hinge section 54 that is slidably received on the rod 50. The flange 20 is provided with a plurality of circumferentially spaced teeth 56 that are outwardly tapered to form spaces between adjacent teeth corresponding to the laterally projecting end 58 of the dog 52 so that when the end 58 is received between a pair of teeth 56 the drum will be locked against rotation on the shaft 14.

Figure 3:
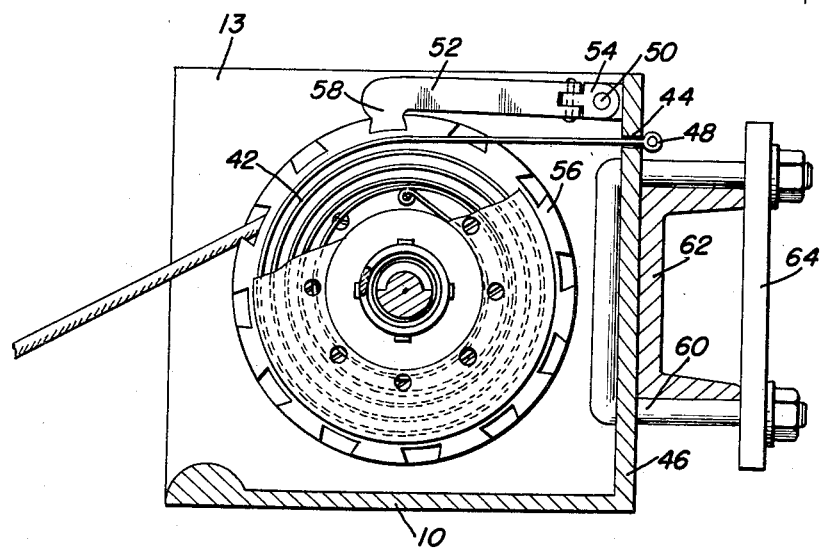
Figure 3 is a vertical sectional view taken substantially on the plane of section line 3—3 of Figure 2.

A pair of U-bolts 60 project through the rear wall 46 of the housing 10 and surround a structural member 62. Bars 64 join the ends of the bolts 60 and rest against the member 62 as shown in Figure 3.

In practical use of the present invention, a cable, rope or the like R is wound about the drum and is attached at one end to the drum and at its other end to a belt of the like that will be placed about the user's waist.

The drum is adjusted on the shaft 14 so that the desired length of cable will be exposed from the drum and then the end 58 of the dog 52 is swung between a pair of teeth 56.

Should the user fall from the building structure and the pawl or dog 58 break, the drum will travel on the shaft 14 until the flange 18 engages the buffer 26, 28. Then, the spring 24 absorbs the shock of the drum moving leftward and the buffer also prevents further rotation of the drum.

Having described the invention, what is claimed as new is:

1. A cable take-up and shock absorber comprising a housing, a threaded rod fixed within said housing, a cable drum including end walls having central threaded openings receivably engaging the rod, a coiled spring having an outer end slidably secured to the housing and an inner end secured to the drum, said housing having a slot therein paralleling the rod and receiving the outer end of the spring, a spring mounted buffer supported in the housing at one end of the rod for engagement by the drum, one end wall of said drum having a series of circumferentially spaced notches therein, and a locking dog having a hinged section slidably mounted in the housing and movable into and out of engagement with a selected notch in the said one end wall to prevent rotation of the drum on the rod.

2. A cable take-up and shock absorber comprising a housing, a threaded rod fixed within said housing, a cable drum including end walls having central threaded openings receivably engaging the rod, a coiled spring having an outer end slidably secured to the housing and an inner end secured to the drum, said housing having a slot therein paralleling the rod and receiving the outer end of the spring, a spring mounted buffer supported in the housing at one end of the rod for engagement by the drum, a helical spring embracing the end of the rod remote from the buffer and having one end secured to the housing and the other end connected to the drum to yieldingly urge the drum away from the buffer, and an anti-friction member connecting the helical spring to the drum.

3. In a cable take-up and shock absorber, a stationary threaded rod, a cable holding drum having a threaded opening receivably engaging the rod, a collar slidably received on one end of the rod, a hub surrounding the collar and secured to the drum, said collar having a flanged portion spaced from the hub, a ball bearing race about the collar and disposed between the flanged portion and the hub, a helical spring about said one end of the rod and terminally secured to the collar and the housing to opposed movement of the drum on the rod away from said one end of said rod, said housing having a slot therein paralleling the rod, and a spiral spring having its inner convolution disposed about the hub and secured to the drum and its outer convolution slidably received in the slot.

JOEL D. SMITH, Sr.

References Cited in the file of this patent

UNITED STATES PATENTS

| Number | Name | Date |
|---|---|---|
| 619,864 | Carr | Feb. 21, 1899 |
| 627,173 | Benbow | June 20, 1899 |
| 702,275 | Arnold | June 10, 1902 |
| 797,076 | Schultz | Aug. 15, 1905 |
| 1,086,617 | Guinn | Feb. 10, 1914 |
| 1,189,381 | Payne et al. | July 4, 1916 |
| 1,622,139 | Getchell | Mar. 22, 1927 |
| 2,303,847 | Lamond | Dec. 1, 1942 |